United States Patent [19]
Eash et al.

[11] 3,773,700
[45] Nov. 20, 1973

[54] NORMALLY CRYSTALLINE VINYLIDENE CHLORIDE POLYMER LATEX AND FIBER MODIFIED CEMENT COMPOSITIONS HAVING ENHANCED ELASTIC MODULUS

[75] Inventors: R. Douglas Eash, Midland; Lz F. Lamoria, Bay City, both of Mich.

[73] Assignee: The Dow Chemical Company, Midland, Mich.

[22] Filed: Feb. 4, 1972

[21] Appl. No.: 223,741

Related U.S. Application Data

[63] Continuation-in-part of Ser. No. 52,110, July 2, 1970, abandoned.

[52] U.S. Cl............ 260/29.6 S, 94/24, 260/29.6 T, 260/29.6 MM, 260/41 C
[51] Int. Cl.......................... C08f 45/24, C08f 45/14
[58] Field of Search ................... 260/29.6 S, 29.7 S, 260/29.6 T

[56] References Cited
UNITED STATES PATENTS

| | | |
|---|---|---|
| 1,954,117 | 4/1934 | Caldwell........................ 260/29.6 S |
| 2,819,239 | 1/1958 | Eberhard et al................ 260/29.6 S |
| 3,021,291 | 2/1962 | Thiessen........................ 260/29.6 S |
| 3,325,435 | 6/1967 | Gibbs............................. 260/29.6 S |

Primary Examiner—Harold D. Anderson
Attorney—William M. Yates et al.

[57] ABSTRACT

Normally crystalline vinylidene chloride polymer latex-modified portland cement compositions having exceptionally high elastic modulus by the incorporation therein of from about 1.5 to about 3 percent of composition volume of a fibrous mixture consisting of (a) a nylon fiber and (b) a steel fiber wherein the fibrous materials are present in the mixture in amounts representing a ratio of (a) to (b) of about 1:2 to 2:1 based on mixture volume; which compositions are particularly suited for use in construction in preparing or repairing structures such as pavement and the like requiring high energy absorption properties.

3 Claims, No Drawings

NORMALLY CRYSTALLINE VINYLIDENE CHLORIDE POLYMER LATEX AND FIBER MODIFIED CEMENT COMPOSITIONS HAVING ENHANCED ELASTIC MODULUS

This application is a continuation-in-part of copending application Ser. No. 52,110 filed July 2, 1970 (now abandoned).

BACKGROUND OF THE INVENTION

Normally crystalline vinylidene chloride polymer latex-modified portland cement compositions, are widely used in construction in preparing, patching, resurfacing and repairing various load bearing structures including pavements, airfield runways, bridge floors, floor underlayments, and in areas requiring high energy absorption properties such as developed in explosions and earthquakes and in structures which are subject to impact such as by flying objects. These structural applications require a high elastic modulus. The modulus of such compositions is enhanced slightly but insufficiently by the presence of the latex material.

It has also been proposed to add fibrous materials to such latex-modified cement compositions primarily to enhance the tensile strength thereof. However, heretofore, the elastic mdoulus of a given portland cement system has been generally considered to be a constant which does not increase significantly with the addition of fibrous materials. That such is the case is illustrated by the data appearing on Table I of Example I set forth infra.

It has now been discovered, which discovery comprises the present invention, that the elastic modulus of the normally crystalline vinylidene chloride polymer latex-modified cement compositions can be significantly and unexpectedly increased by the addition thereto of the hereinafter specified mixtures of fibrous materials.

SUMMARY OF THE INVENTION

The unexpected enhancement in elastic modulus of normally crystalline vinylidene chloride polymer latex-modified portland cement compositions is attained by addition to such cement compositions of from about 1.5 to about 3 percent by composition volume of a fibrous mixture consisting of (a) nylon fiber and (b) steel fiber; wherein the individual fibrous materials are present in such mixture in amounts representing a ratio of (a) to (b) of about 1:2 to 2:1 based on mixture volume.

DESCRIPTION OF THE PREFERRED EMBODIMENTS

By the term "normally crystalline vinylidene chloride polymer latex" as used herein is meant latexes prepared from those polymers of vinylidene chloride which exhibit crystallinity when examined by X-ray diffraction methods or between crossed Nicol prisms and compositions prepared therefrom by the inclusion of modifying agents which compositions retain the working characteristics of the crystalline polymers. The normally crystalline vinylidene chloride polymers are those as described, for example, in the U.S. Pat. Nos. 2,233,442; 2,251,486; 2,291,670; 2,321,292 and 2,753,321.

Exemplary of such polymers are interpolymers wherein the major polymeric constituent is vinylidene chloride which is present in the latexes in proportions of greater than 50 to about 90 percent by weight being interpolymerized with less than 50 to about 10 percent by weight of at least one interpolymerizable material. The interpolymerizable material may be composed of at least one monomer having the general formula:

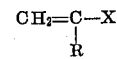

wherein R is hydrogen or the methyl group and X is selected from the group consisting of —CN, halogens of atomic numbers 9 to 35, and ester forming groups —COOY, wherein Y is a primary or secondary alkyl group containing up to and including 18 carbon atoms.

Illustrative of monomeric materials applicable in the preparation of suitable interpolymer latexes are methyl acrylate, ethyl acrylate, propyl acrylate, isopropyl acrylate, butyl acrylate, isobutyl acrylate, sec.-butyl acrylate, tert.-butyl acrylate, amyl acrylate, isoamyl acrylate, tert.-amyl acrylate, hexyl acrylate, 2-ethylhexyl acrylate, cyclohexyl acrylate, octyl acrylate, 3,5,5-trimethylhexyl acrylate, decyl acrylate, dodecyl acrylate, octyl acrylate, octadecenyl acrylate, methyl methacrylate, ethyl methacrylate, propyl methacrylate, butyl methacrylate, n-amyl methacrylate, sec.-amyl methacrylate, 2-ethylbutyl methacrylate, octyl methacrylate, phenyl methacrylate, cyclohexyl methacrylate, 3,5,5-trimethylhexyl methacrylate, decyl methacrylate, dodecyl methacrylate, and octadecyl methacrylate and butoxyethyl acrylate or methacrylate or other alkoxyethyl acrylates or methacrylate, vinyl chloride, acrylonitrile, methacrylonitrile, and the like.

Particularly effective latexes are prepared from the interpolymers containing vinylidene chloride, vinyl chloride, and ethyl acrylate in approximate percentage weight proportions of 70:20:10 and 75:20:5, respectively; a vinylidene chloride, vinyl chloride and 2-hexylacrylate interpolymer latex the polymeric materials being present in approximate percentage weight proportions of 52:35:13 respectively; and particularly an interpolymer latex containing about 75 parts by weight of vinylidene chloride and about 20 parts by weight vinyl chloride, about 5 parts by weight ethyl acrylate and about 2 parts by weigh of methyl methacrylate. Generally, the latex to cement ratio by weight is preferably between about 0.1, where a neat cement system is used, up to about 0.25, where a conventional aggregate cement system is employed.

The aggregate used may be stone, gravel, concrete, carborundum, aluminum oxide, emery, marble chips, sawdust, cinders, asbestos, mica, talc, flint or manufactured particles such as powdered ceramic material, or any other material which may serve the purpose of sand. The intended end use of the concrete system will serve as a guide to those skilled in the art as to the choice or preferred particle size of the aggregate material to be included in the latex-modified mortar of the present invention.

The fibrous mixtures of the present invention are generally used in amounts of from about 1.5 percent of composition volume, preferably where an aggregate system is used, to about 3 percent of composition volume where a neat cement system is used. Optimum results are obtained wherein the synthetic nylon fiber component of such fibrous mixture and the steel fiber component are present in such mixture in amounts representing a ratio of nylon fiber to steel fiber of about 1:2 to 2:1 based on mixture volume.

The nylon fiber used has an elastic modulus less than the portland cement as well as the steel fibers used. Particularly preferred nylon fibers are those having the necessary elastic modulus and in addition, having a density of about 71 pounds per cubic foot and an elastic modulus of about $3 \times 10^5$ psi.

Exemplary of steel fibers which may be used are those fibers having an elastic modulus greater than the nylon fiber and the portland cement used. Particularly preferred steel fibers are those having an elastic modulus of about $29 \times 10^6$ psi.

It is to be understood that the size of the nylon or steel fibers may vary within commonly used ranges.

Example I

In each of a series of individual experiments, the hereinafter identified concrete mixes were prepared and used to make 2 inch by ½ inch by 23 inch flexural bars. Each bar was cured for 24 hours in the molds while covered with wet sponges. The bars were than placed in a 95–100 percent humidity box maintained at a temperature of 75°F. Latex-modified bars were cured for 3 days in the humidity box followed by 24 additional days curing at 50 percent relative humidity at 73°F. Bars prepared from formulations from which the latex had been excluded were cured for 27 days in a 95–100 percent humidity box maintained at 75°F.

After the initial cure, the bars were dried in a 200°F oven for 7 days to remove free water in the samples and tested in an Instron testing machine for flexural strength with center point loading over a 10-inch span. The load versus deflection was recorded on a chart on the machine. The elastic modulus of each test bar was calculated over that portion of the curve equal to one third of the ultimate load by the standard formulation.

$$E = wL^3/4sb_d{}^3$$

where $E$ = elastic modulus in psi; $w$ = load in pounds; $L$ = length of test span in inches; $s$ = deflection in inches; $b$ = width of test bar in inches; $d$ = thickness of test bar in inches.

The following Table I illustrates the effect of fiber addition on the elastic modulus of nonlatex-modified cement systems wherein each sample was formulated as follows:

| Formulation Ingredient | Cement System A Pounds | Cement System B Pounds |
|---|---|---|
| Sand (ASTM fine aggregate for concrete passing through a No. 4 screen) | 250 | 0 |
| Portland Cement | 100 | 100 |
| Water | 46 | 29 |
| Total | 396 | 129 |
| Absolute Volume | 2.76 cu. ft. | 0.960 cu. ft. |

TABLE I

Effect of Fiber Addition on Elastic Modulus of Non-latex Modified Cement Systems

| Sample No. | Fiber Type | % by Vol. | Elastic Modulus (psi) |
|---|---|---|---|
| Cement System A | | | |
| 1 | None | | $2.59 \times 10^6$ |
| 2 | Nylon[1] | 1.75 | $2.04 \times 10^6$ |
| 3 | Steel[2] | 1.75 | $2.35 \times 10^6$ |
| 4 | Nylon[1] plus Steel[2] | 1.17 | $2.82 \times 10^6$ |
| Cement System B | | | |
| 5 | None | | $1.58 \times 10^6$ |
| 6 | Nylon[1] | 3 | $2.03 \times 10^6$ |
| 7 | Steel[2] | 3 | $0.60 \times 10^6$ |
| 8 | Nylon[1] plus Steel[2] | 1 | $1.46 \times 10^6$ |
| 9 | Steel[2] Nylon[1] plus Steel[2] | 2 2 1 | $2.29 \times 10^6$ |

[1] Nylon fiber: 15 Denier × ¾ inch, elastic modulus $3 \times 10^5$.
[2] Steel fiber: Round, low carbon, bright, $1 \times 0.016$ inch, elastic modulus $29 \times 10^6$.

All of the above values for elastic modulus are within experimental error, except for Sample 7 of Table I. The above data illustrates that the addition of nylon or steel fibers individually or in combination (as prescribed by this invention), does not significantly increase the elastic modulus of the nonlatex-modified cement systems.

The following Table II illustrates the effect of latex addition upon the elastic modulus, compression strength and flexural strength of the cement systems of Table I. The latex used was of the following composition:

| Formulation Ingredients | Parts by Wt. |
|---|---|
| Vinylidene Chloride | 75 |
| Vinyl Chloride | 20 |
| Ethyl Acrylate | 5 |
| Methyl Methacrylate | 2 |

TABLE II

| Sample No. | Latex Solids (lbs.) | Elastic Modulus (psi) | Compression Strength (psi) | Flexural Strength (psi) |
|---|---|---|---|---|
| Cement System A | | | | |
| 10 | 0 | $2.59 \times 10^6$ | 7,070 | 1,550 |
| 11 | 20 | $3.16 \times 10^6$ | 11,900 | 2,680 |
| Cement System B | | | | |
| 12 | 0 | $1.58 \times 10^6$ | 14,600 | 1,360 |
| 13 | 15 | $2.11 \times 10^6$ | 16,100 | 2,230 |

The above data illustrate that the addition of the latex to the cement compositions enhances the elastic modulus only slightly while significantly enhancing the compression and flexural strength of the cement system.

The following Table III illustrates the effect of fiber addition of the elastic modulus, compression strength and flexural strength of the herein-described latex-modified cement systems, wherein Cement System A (Sample Numbers 14–17 inclusive) contains 20 pounds of latex solids and Cement System B (Sample Numbers 18–22 inclusive) contains 15 pounds of latex solids:

TABLE III

| Sample No. | Fiber Type | % by Vol. | Elastic Modulus (psi) | Compression Strength (psi) | Flexural Strength (psi) |
|---|---|---|---|---|---|
| (For comparison) Cement System A | | | | | |
| 14 | None | | $3.16 \times 10^6$ | 11,900 | 2,680 |
| 15 | Nylon[1] | 1.75 | $3.21 \times 10^6$ | 11,400 | 2,800 |
| 16 | Steel[2] | 1.75 | $3.12 \times 10^6$ | 12,700 | 2,700 |
| (The Invention) | | | | | |
| 17 | Nylon[1] plus Steel[2] | 0.58 1.17 | $5.78 \times 10^6$ | 11,400 | 2,230 |
| Cement System B (For Comparison) | | | | | |
| 18 | None | | $2.11 \times 10^6$ | 16,100 | 2,230 |
| 19 | Nylon[1] | 3 | $2.22 \times 10^6$ | 14,700 | 3,360 |
| 20 | Steel[2] | 3 | $2.33 \times 10^6$ | 18,100 | 4,170 |
| (The Invention) | | | | | |
| 21 | Nylon[1] plus Steel[2] | 1 2 | $5.58 \times 10^6$ | 16,900 | 3,210 |
| 22 | Nylon[1] plus Steel[2] | 2 1 | $4.05 \times 10^6$ | 15,100 | 2,490 |

The above data illustrate the unexpectedly enhanced elastic modulus obtained by the addition of the combination of nylon and steel fibers to the described latex-modified cement system. Such data also illustrate that the enhancement in elastic modulus is obtained without loss in compression or flexural strength.

What is claimed is:

1. A composition comprising essentially of (1) a normally crystalline vinylidene chloride polymer latex-modified portland cement said normally crystalline vinylidene chloride polymer containing from about 50 to 75 percent by weight vinylidene chloride with the remainder being a monoethylenically unsaturated comonomer selected from the group consisting of vinyl chloride, ethylacrylate, 2-hexylacrylate, methylmethacrylate and mixtures thereof and (2) from about 1.5 to about 3 percent by composition volume of a fibrous mixture consisting of (a) a fibrous nylon having an elastic modulus of about $3 \times 10^5$ psi and (b) a fibrous steel, said fibrous steel having an elastic modulus of about $29 \times 10^6$ psi and wherein said fibrous nylon and said fibrous steel are present in amounts representing a ratio of (a) to (b) of about 1:2 to 2:1 based on mixture volume.

2. The composition of claim 1 wherein said fibrous nylon is about 15 denier by 3/4 inch in size and said fibrous steel is about 1 inch in length by 0.016 inch in diameter.

3. The composition of claim 2 wherein said vinylidene chloride polymer is an interpolymer of about 75 parts by weight vinylidene chloride, about 20 parts by weight vinyl chloride, about 5 parts by weight ethylacrylate and about 2 parts by weight methyl methacrylate.

* * * * *

PO-1050
(5/69)

UNITED STATES PATENT OFFICE
CERTIFICATE OF CORRECTION

Patent No. 3,773,700          Dated November 20, 1973

Inventor(s) R. Douglas Eash and Lz F. Lamoria

It is certified that error appears in the above-identified patent and that said Letters Patent are hereby corrected as shown below:

In Column 3, lines 55-64 in Table I, the following errors have been found.

In line 64, the number "4" has been left out from the first column; "Nylon$^{(1)}$" has been left out from the second column and "0.58" has been left out from the third column.

The first part of the table is printed below for easier determination of the errors.

TABLE I

Effect of Fiber Addition on Elastic Modulus of Nonlatex Modified Cement Systems

| Sample No. | Fiber Type | % by Vol. | Elastic Modulus (psi) |
|---|---|---|---|
| Cement System A | | | |
| 1 | | None | $2.59 \times 10^6$ |
| 2 | Nylon$^{(1)}$ | 1.75 | $2.04 \times 10^6$ |
| 3 | Steel$^{(2)}$ | 1.75 | $2.35 \times 10^6$ |
| 4 | Nylon$^{(1)}$ plus Steel$^{(2)}$ | 0.58 1.17 | $2.82 \times 10^6$ |

Signed and sealed this 2nd day of April 1974.

(SEAL)
Attest:

EDWARD M. FLETCHER, JR.
Attesting Officer

C. MARSHALL DANN
Commissioner of Patents